(12) United States Patent
Guy et al.

(10) Patent No.: US 11,181,949 B2
(45) Date of Patent: Nov. 23, 2021

(54) RETRACTABLE KEYBOARDS

(71) Applicant: Apple Inc., Cupertino, CA (US)

(72) Inventors: Ian A. Guy, Cupertino, CA (US); Ari P. Miller, San Francisco, CA (US); Edward J. Cooper, Campbell, CA (US); Houtan R. Farahani, San Ramon, CA (US); Kevin M. Robinson, Sunnyvale, CA (US); Riley E. Brandt, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 16/536,014

(22) Filed: Aug. 8, 2019

(65) Prior Publication Data

US 2020/0201399 A1    Jun. 25, 2020

Related U.S. Application Data

(60) Provisional application No. 62/783,993, filed on Dec. 21, 2018.

(51) Int. Cl.
*G06F 1/16*    (2006.01)
*H01H 13/18*    (2006.01)
*G06F 3/02*    (2006.01)

(52) U.S. Cl.
CPC .......... *G06F 1/1666* (2013.01); *G06F 1/1664* (2013.01); *G06F 1/166* (2013.01); *G06F 1/1662* (2013.01); *G06F 3/0208* (2013.01); *H01H 13/186* (2013.01)

(58) Field of Classification Search
CPC ............................ G06F 1/1664; G06F 1/1666
See application file for complete search history.

(56) References Cited

U.S. PATENT DOCUMENTS

| | | | |
|---|---|---|---|
| 10,496,129 B2* | 12/2019 | Miyamoto | G06F 1/1694 |
| 2016/0055990 A1* | 2/2016 | Krumpelman | G06F 3/0221 |
| | | | 361/679.09 |
| 2016/0329174 A1* | 11/2016 | Chen | G06F 1/1616 |
| 2017/0294277 A1* | 10/2017 | Huang | H01H 3/125 |
| 2018/0253124 A1* | 9/2018 | David | G06F 1/1666 |
| 2019/0129515 A1* | 5/2019 | Morrison | H01H 13/84 |

* cited by examiner

*Primary Examiner* — Nidhi Thaker
(74) *Attorney, Agent, or Firm* — Dorsey & Whitney LLP

(57) ABSTRACT

Keyboards are disclosed that are retractable. Movable magnetic or mechanical linkage elements are configured to reposition keycaps and stabilizers between different relative positions. Structures in a movable layer can act on the keycaps or stabilizers to move the keycaps and stabilizers into a retracted position for storage and for saving space in an electronic device. The stabilizers can be scissor mechanisms, butterfly mechanisms, and similar devices. The movable layer can be moved in response to rotation of a hinge or other mechanical element in the electronic device.

19 Claims, 8 Drawing Sheets

RETRACTABLE KEYBOARDS

CROSS-REFERENCE TO RELATED APPLICATION(S)

This claims priority to U.S. Provisional Patent Application No. 62/783,993, filed 21 Dec. 2018, and entitled "RETRACTABLE KEYBOARDS," the entire disclosure of which is hereby incorporated by reference.

FIELD

The described embodiments relate generally to keyboard features that can change their positioning relative to a housing. More particularly, the present embodiments relate to retractable keyboards.

BACKGROUND

Many electronic devices have interface devices and mechanisms to receive input and interaction from users. Major fields for device interaction include computers, such as personal computers, tablet computers, smartphones, and other "smart" devices, such as media players, video and audio equipment, vehicle consoles, home automation controllers, and related devices. These devices can include keyboards, keypads, buttons, touchpads, and so on to receive user input. In some cases, the input devices can also provide output and feedback to users as well, such as through visual, touch/haptics, or audio indicators.

Recent advances in computing devices have allowed device makers to dramatically reduce the size of electronic components. Portable devices have become thinner, lighter, and more efficient. However, mechanical user interfaces with the devices have parts that can be difficult to change in size due to user preferences. Users expect devices to have a button or key size that is well-suited for a finger to press, and users generally have a preference for buttons or keys that provide audible and tactile feedback when pressed. Thus, user interfaces such as keyboards and other buttons are designed to have a predetermined size and amount of perceived deflection when pressed. These constraints can make devices larger than needed for some tasks, such as when the user interfaces of the devices are not being used or are stored.

Accordingly, there are many challenges and areas for improvements in the interface components of computing devices, and device makers are constantly seeking ways to enhance a user's experience.

SUMMARY

Aspects of the present disclosure relate to electronic devices, keyboards, and key assemblies that can be change the positioning of some of their parts relative to a housing, such as by reducing their thickness. One aspect of the disclosure relates to a keyboard comprising a base layer, a keycap, a stabilizer coupled to the keycap and coupled to the base layer, with the stabilizer being movable between a raised configuration and a lowered configuration, wherein the keycap is spaced farther away from the base layer when in the raised configuration relative to the lowered configuration, and a magnetic structure movable between a first position relative to the base layer and a second position relative to the base layer. The magnetic structure can draw the stabilizer from the raised configuration to the lowered configuration upon movement of the magnetic structure from the first position to the second position.

The stabilizer can comprise a pivotable mechanism having a pivot point. The first position of the magnetic structure can be located on a first side of the pivot point, and the second position of the magnetic structure can be located on a second side of the pivot point, with the second side being opposite the pivot point relative to the first side. In the second position, the magnetic structure can draw a portion of the stabilizer toward the base layer, with the portion of the stabilizer being positioned opposite the pivot point relative to the base layer when the stabilizer is in the raised configuration.

The stabilizer can comprise a ferrous portion attracted to the magnetic structure, or the keycap can comprise a ferrous portion attracted to the magnetic structure. The magnetic structure can also be coupled to the stabilizer. The magnetic structure can be coupled to a slidable linkage, with the sliding linkage being translatable relative to the keycap and stabilizer to move the magnetic structure between the first and second positions. In the first position, the magnetic structure can be positioned laterally farther from a central axis of movement of the keycap than in the second position. The keyboard can further comprise a ferrous material, wherein upon movement of the stabilizer from the raised configuration to the lowered configuration, the magnetic structure breaks contact with the ferrous material. Movement of the magnetic structure from the first position to the second position can break contact between the magnetic structure and a first portion of the ferrous material.

Another aspect of the disclosure relates to a laptop computer comprising a lid housing, a display positioned in the lid housing, a base housing connected to the lid housing by a hinge, with the lid housing being movable relative to the base housing between a closed position wherein the display faces the base housing and an open position, and a keyboard assembly positioned in the base housing. The keyboard assembly can include a set of keys, with the set of keys being movable between a retracted position relative to the base housing and an extended position relative to the base housing, wherein movement of the lid housing from the closed position to the open position causes the set of keys to move from the retracted position to the extended position.

In some embodiments, the computer can further comprise a linkage positioned in the base housing and movable between a first position and a second position, wherein movement of the lid housing relative to the base housing can cause movement of the linkage between the first and second positions. Movement of the linkage can apply a force to the set of keys to move the keys between the retracted and extended positions. The force can be a mechanical force or a magnetic force.

At least one magnet can draw the set of keys from the extended position to the retracted position. Rotation of the hinge can be configured to move the at least one magnet within the base housing.

Yet another aspect of the disclosure relates to a laptop computer comprising an upper housing coupled to a display, a lower housing having a top surface, a base layer positioned in the lower housing, and a keycap positioned above the base layer. The keycap can have an outward-facing surface, with the keycap being movable between a first position and a second position. In the first position, the outward-facing surface can be positioned higher than the top surface, and in the second position, the outward-facing surface can be at most positioned in-plane with the top surface. The computer can also include a positioning mechanism actuatable to move at least one magnetic body in the lower housing in response to a user input, wherein movement of the at least one magnetic body is configured to move the keycap between the first and second positions.

The user input can comprise application of a force to move the upper housing relative to the lower housing. The at least one magnetic body can translate in the lower housing in response to the user input. The computer can also comprise a compressible dome positioned below the keycap, with the compressible dome being retractable relative to the lower housing in response to the user input.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
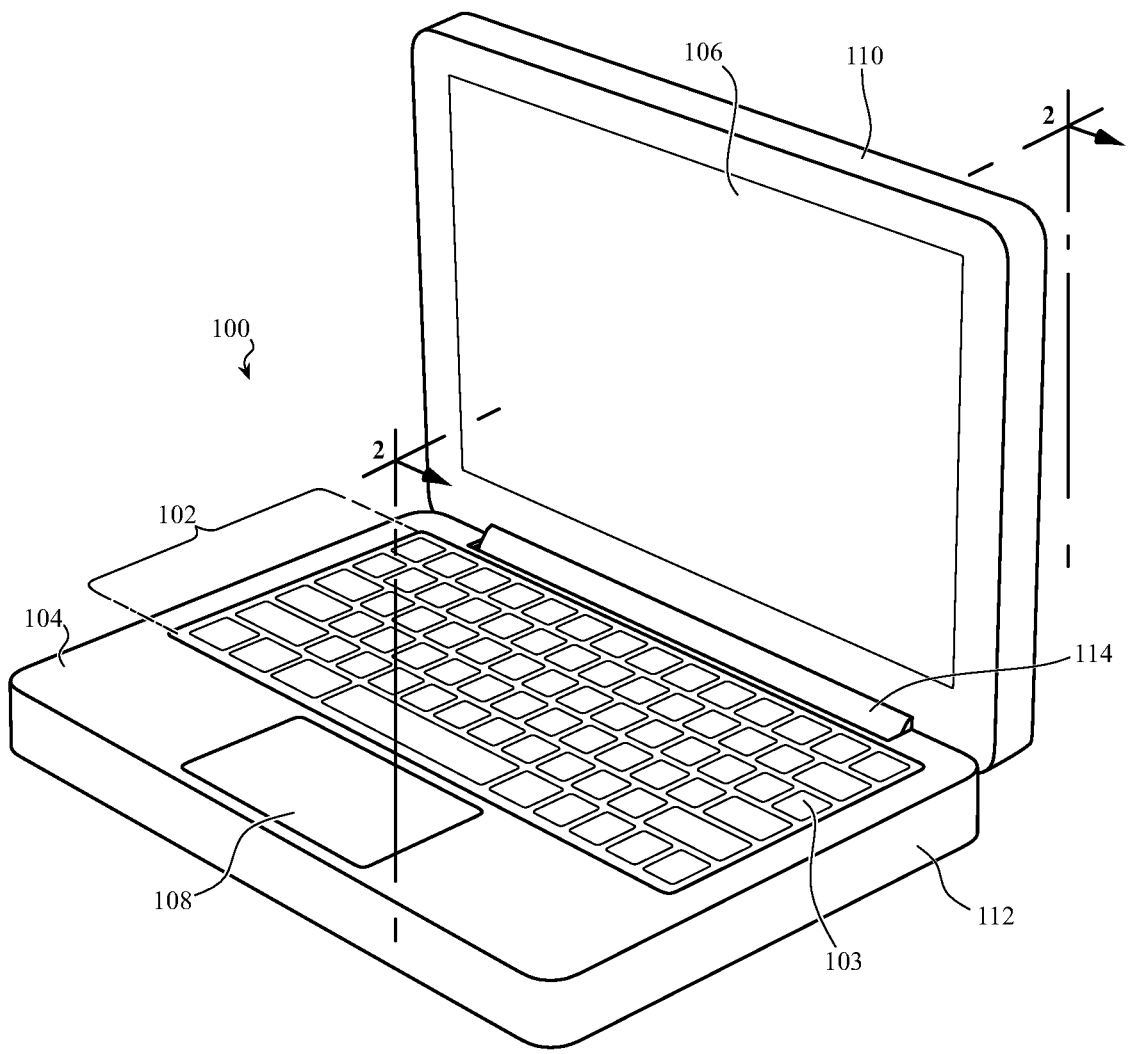
FIG. 1 shows an isometric view of an electronic device according to an embodiment of the present disclosure.

Interface devices such as computer keyboards and buttons in smartphones, tablets, computers, and other interactive devices are often required to provide a desired amount and type of deflection, force-resistance, tactility, noise or combination thereof. These factors can contribute to the user's satisfaction in using the device and their perceived quality of the device and its construction. The cost and methods used to construct and provide these interface devices can also be significant factors in their design and implementation.

Accordingly, device makers can implement keyboards or other button devices that have keys (or buttons) with a travel distance (i.e., the distance that the key or button deflects when pressed by the user). In order for the keys to travel through a travel distance, there must be space in the keyboard below the keycap and into which the keycap can move when pressed. The keys can be supported by a stabilizer (e.g., a butterfly mechanism, folding mechanism, or scissor mechanism) and a biasing member (e.g., an elastic dome) that collapse or flatten into the space under the keycap to accommodate key movement.

In devices such as keyboards for laptop computers, tablet computers, and related portable devices, the thickness of the keyboard can be a significant contributor to the overall thickness of the device. Accordingly, device makers often seek ways to reduce the thickness of the keyboard in order to improve portability and reduce the overall thickness of the device. Keyboards are also a particular area of interest for reducing thickness since they are made with internal empty space within their structures to accommodate keycap movement. Reducing that space or more efficiently using the space can reduce the overall thickness of a device.

Aspects of the present disclosure relate to apparatuses and methods for selectively reducing the thickness of a keyboard by selectively retracting or extending the keys of the keyboard relative to an internal keyboard mounting or support layer. Accordingly, the keys can be moved between a neutral position and a retracted position (or between a neutral position and an extended position) by mechanisms in the keyboard or device to which the keyboard is attached. In some embodiments, the thickness of the keyboard can change when the device is opened, when the device is closed, when the keyboard is moved into an inaccessible position, or when the keyboard is moved into an input-receiving position.

As used herein, a key assembly in a "retracted" position differs from one in an otherwise depressed or actuated position (e.g., a position where the user has pressed down on the key) because in a retracted position, the key assembly can remain in a reduced thickness or otherwise compressed configuration without a user applying a force to the keycaps by a finger or instrument (e.g., without the user pressing on a top surface of the keycap downward with a finger, device housing, or display). In some embodiments, the retracted position is associated with a storage mode of the keyboard.

In one aspect of the present disclosure, the keys are supported by pivoting or folding stabilizers that are forced to collapse or flatten by movement of components in or around the keyboard. The moving components can be mechanical linkages that induce motion of the stabilizers that pulls the keys into a retracted state similar to the state into which the keys move when pressed down by a user. The moving components can therefore pull or push on the stabilizers to make them collapse or flatten. In some cases, the moving components have magnetic elements that attract (or are attracted to) magnetic elements on the stabilizer, keycap, or other part of the mechanism. The moving components can move the magnets between a position configured to keep the keycaps in an extended position and a position configured to keep the keycaps in a lower position.

In some embodiments, a magnetic structure can be movable between a first position on a first side of a pivot point of a stabilizer to an opposite second side of the pivot point of the stabilizer. In the first position, the magnetic structure can repel a portion of the stabilizer, and in the second position, the magnetic structure can attract the portion of the stabilizer. In another case, the magnetic structure can attract the portion of the stabilizer in the first and second positions, but the portion is more strongly attracted in the second position relative to the first position due to an increase in the strength of the magnetic field affecting certain portions of the stabilizer. In this case, the magnetic field attracting certain portions of the stabilizer in the first position can be negligible or significantly smaller than the field attracting those portions of the stabilizer in the second position such that the stabilizer moves in response to the movement of the magnetic structure between the first and second positions. Movement of the magnetic structure from the second position back to the first position can reduce the strength of the magnetic field affecting those portions of the stabilizer so that the stabilizer can operate normally (i.e., without having its ability to be displaced during actuation significantly impacted by the effects of the magnetic field).

Magnetic structures in the keycap, stabilizer, and movable structure can comprise a magnet (e.g., a permanent magnet or electromagnet) and a material attracted to the magnet (e.g., a ferrous material). For example, the keycap or stabilizer can comprise a ferrous material attached to, or integrally part of, the keycap or stabilizer, and the movable structure can comprise a permanent magnet. Thus, positioning the permanent magnet relative to the ferrous material can attract the keycap or stabilizer toward the movable retraction structure. Alternatively, the keycap or stabilizer can comprise the magnet, and the movable structure can comprise a ferrous component. In another case, the keycap, stabilizer, and movable structure can all comprise magnets. The relative movement of the magnets can attract or repel the parts from each other as needed to change the relative positioning of the keycaps.

The moving components can be positioned on a translatable sheet (or set of strips of material) configured to move in a plane positioned under the keycaps. In some embodiments, the translatable sheet can be moved in response to movement of a housing lid or cover for the keyboard. For example, the translatable sheet can be linked to a laptop hinge in a manner that converts the rotation of the hinge into a generally linear translation of the sheet. The translatable sheet can be referred to as a sliding linkage and can have a shape configuration different from a sheet, such as, for example, one or more rods, tabs, strips, or related components.

In other embodiments, the keys are acted upon by components that do not move in the housing of the keyboard or computer. For example, electromagnet components can be positioned under the keycaps, and energization of the electromagnets can raise or lower the keycaps.

Magnetic structures in the keycap, stabilizer, and retraction structures can also be used to provide tactile feedback to the user when keys are pressed or retracted. For example, a user's downward pressure on a keycap can at least partially break contact between a magnet and a ferrous element in the key structures. The same magnet can be used to retract the key independent of the user applying direct pressure to the keycap.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

FIG. 1 depicts an electronic device 100 including a keyboard 102. The keyboard 102 includes key mechanisms or assemblies with keycaps 103 or button caps that move when depressed by a user. The keyboard 102 can be positioned within a housing 104 that also contains a display 106 (e.g., a liquid crystal display screen) and a track pad 108. The housing 104 can comprise an upper housing 110 supporting the display 106 and a base housing 112 supporting the keyboard 102 and track pad 108. The upper and base housing 110, 112 can be joined at a hinge 114 about which the upper housing 110 can rotate relative to the lower portion 112. The upper housing 110 can be referred to as a lid portion, and the base housing 112 can be referred to as a base portion.

Although the electronic device 100 of FIG. 1 is shown as a notebook/laptop computer, it will be readily apparent that features and aspects of the present disclosure that are described in connection with the notebook computer can be applied in various other devices. These other devices can include, but are not limited to, personal computers (including, for example, computer "towers," "all-in-one" computers, computer workstations, and related devices) and related accessories, speakers, graphics tablets and graphical input pens/styluses, watches, headsets, other wearable devices, and related accessories, vehicles and related accessories, network equipment, servers, screens, displays, and monitors, photography and videography equipment and related accessories, printers, scanners, media player devices and related accessories, remotes, headphones, earphones, device chargers, computer mice, trackballs, and touchpads, point-of-sale equipment, cases, mounts, and stands for electronic devices, controllers for games, remote control (RC) vehicles/drones, augmented reality (AR) devices, virtual reality (VR) devices, home automation equipment, and any other electronic device that uses, sends, or receives human input. Thus, the present disclosure provides illustrative and non-limiting examples of the kinds of devices that can implement and apply aspects of the present disclosure.

Figure 2:
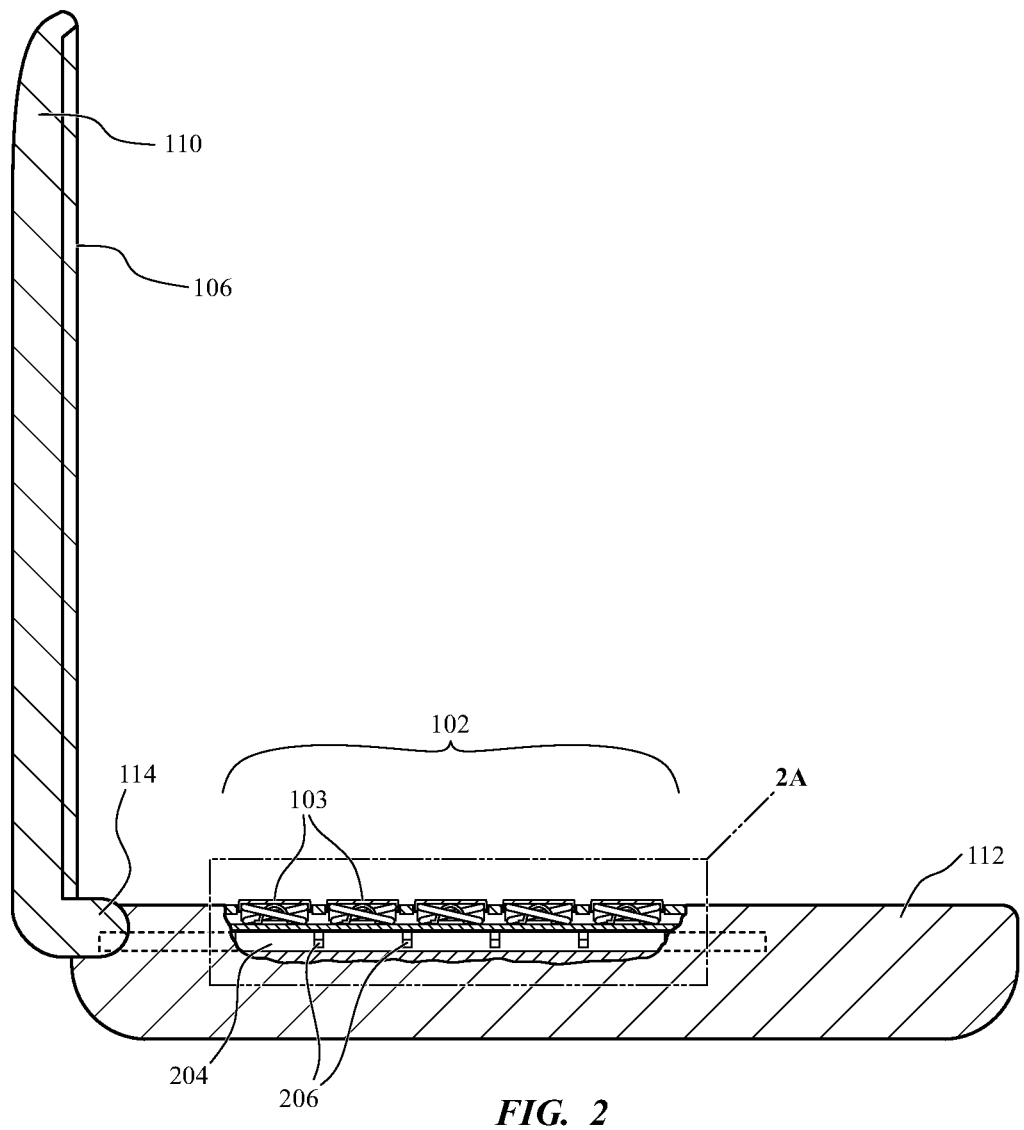
FIG. 2 shows a partial sectional side view of the electronic device of FIG. 1 with the device in an open configuration.

The keyboard 102 can include a set of assembled components for each key. The assembly of these components can be referred to as a "stack-up" due to their substantially layered configuration. FIG. 2 shows a diagrammatic partial side section view of the electronic device 100 of FIG. 1, as indicated by section lines 2-2 in FIG. 1. Each of the keycaps 103 are supported by a stabilizer 200 and a base layer 202. A movable layer 204 can be located below the keycaps 103 and stabilizers 200. The movable layer 204 can comprise a set of magnets 206 configured to move with the movable layer 204.

In FIGS. 1 and 2, the electronic device 100 is in an open configuration. In other words, the upper housing 110 of the housing 104 is rotated away from the base housing 112 (about hinge 114) and is not covering or closed over the keyboard 102. The keyboard 102 is therefore exposed and available for access by the user (i.e., able to receive input from the user).

The base layer 202 can comprise a feature plate, substrate, printed circuit board (PCB), chassis component, or similar support structure configured to support the stabilizers 200 and keycaps 103. The base layer 202 can be generally rigid and flat. In some embodiments, the base layer 202 can be positioned vertically lower than at least some portions of the movable layer 204. For example, in some embodiments a movable layer 204 comprising a set of strips of material can have those strips positioned in open spaces between the keycaps 103 and the base layer 202.

The keycaps 103 and stabilizers 200 are in a raised position in FIGS. 1 and 2. Thus, the keycaps 103 and stabilizers 200 are fully extended away from the base layer 202 and movable layer 204. Each of the keycaps 103 can be positioned over an open space or void 201 between the keycaps 103 and base layer 202. The stabilizers 200 can each be positioned in the void 201. Pressing the keycaps 103 can cause the keycaps 103 and the stabilizers 200 to occupy additional volume in the void 201 relative to the position shown in FIG. 2. In some embodiments, each keycap 103 has a separate void 201 underneath it. Additionally, in some embodiments the void 201 is substantially filled with compressible or redistributable material (e.g., compressible foam, gel, or rubber), but the keycap 103 is still capable of being pressed into the void 201 and occupying space within the void 201 due to compression or another accommodating change to the shape or size of the compressible or redistributable material.

Figure 2A:
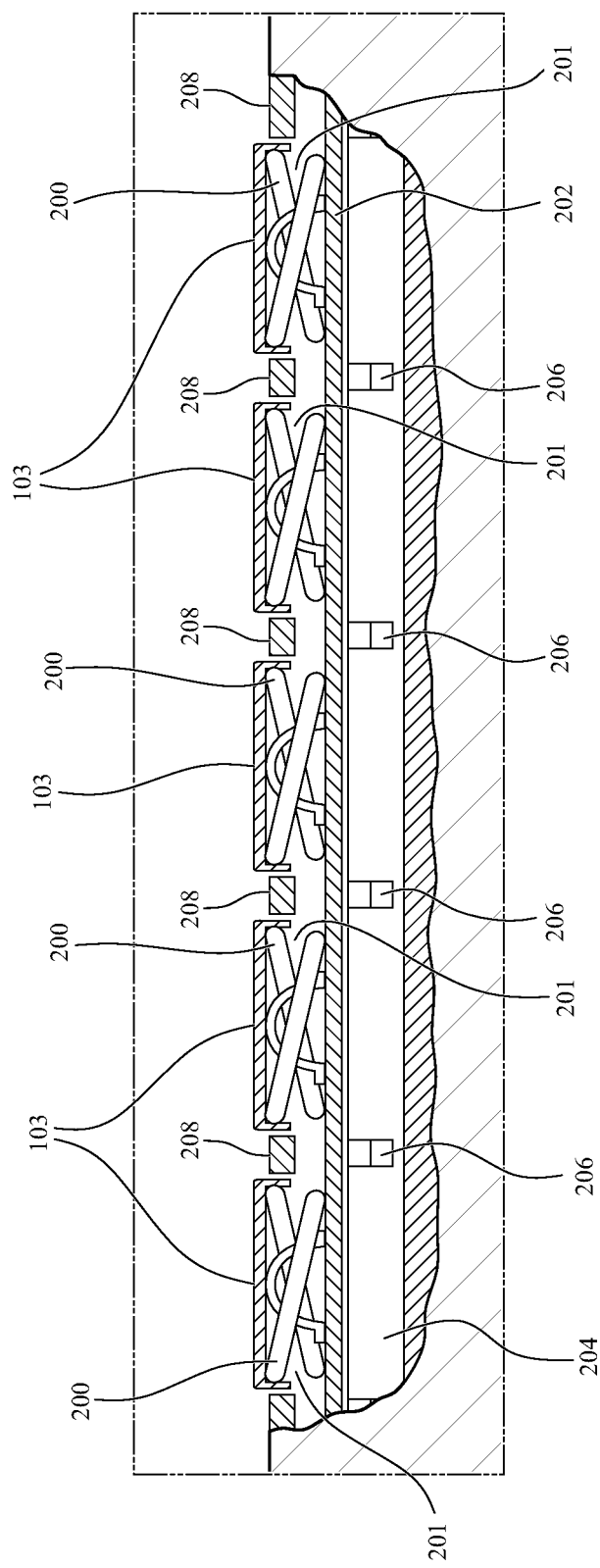
FIG. 2A shows a detail view of FIG. 2.

As shown in FIG. 2, the keycaps 103 protrude from a top surface 208 of the base housing 112. See also FIG. 2A, which is a detail view of the keyboard portion of FIG. 2. In some embodiments, the top surface 208 is the top surface of a web structure interspersed between or framing the keycaps 103. In some embodiments, the top surface 208 is the top surface of a track pad 108 or a palm rest portion of the base housing 112. The top surface 208 can also be the outer top surface of the base housing 112 surrounding the keyboard 102. The top surface 208 can be referred to as an outward-facing surface since it faces outward relative to the inward direction (i.e., a direction pointing downward in FIG. 2 under the keycaps or within the electronic device housing).

Vertically protruding keycaps 103 can be easier to use by feel since their edges are spaced apart from each other and relative to the top surface 208. Thus, the keycaps 103 can have improved key definition in the configuration shown in FIGS. 1, 2, and 2A. See also FIGS. 4, 6, 7, 9, 12, and 13 and their related descriptions herein. In a retracted position, the keycaps 103 do not protrude (or protrude less) from the top surface 208 and are retracted to a state where they are less protruding, flat or even with a plane of the top surface 208, or recede below the top surface 208. See also FIGS. 3, 5, 8, 10, and 14 and their related descriptions herein.

Figure 3:
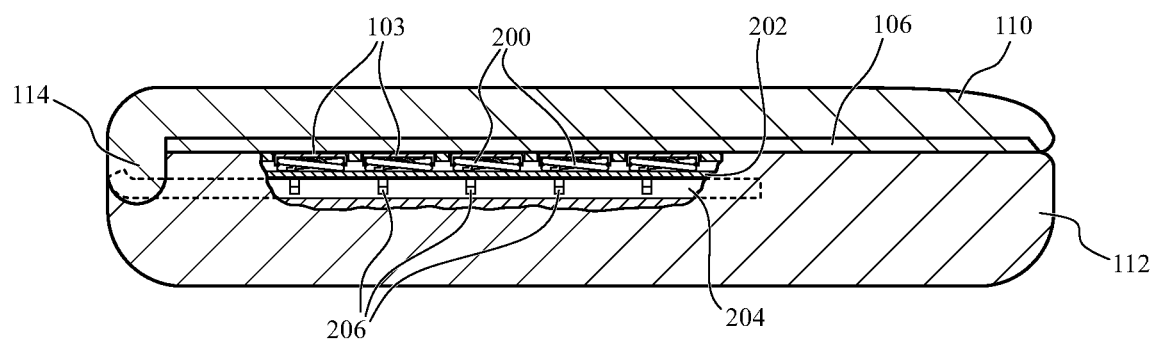
FIG. 3 shows a partial sectional side view of the electronic device of FIG. 1 with the device in a closed configuration.

FIG. 3 shows a diagrammatic side section view wherein the electronic device 100 is in a closed configuration. The upper housing 110 of the housing 104 is rotated to a position substantially parallel to the base housing 112 (about hinge 114) and is covering the keyboard 102. In this position, the keyboard 102 is enclosed by the upper housing 110 of the housing and is inaccessible to the user. In this configuration, the keycaps 103 cannot be accessed or pressed by the user due to the presence of the upper housing 110 of housing 104, so they may not need to be in a raised or extended configuration. When covered, they do not need to provide key definition for a user's touch.

The keycaps 103 are in a retracted or reduced-thickness configuration in FIG. 3. In this configuration, the keycaps 103 are moved into the void 201 shown in FIG. 2, and the stabilizers 200 are collapsed to accommodate the keycaps 103. Thus, the keycaps 103 and stabilizers 200 occupy additional volume in the void 201 relative to the configuration shown in FIG. 2. The collapse of the stabilizers 200 also reduces the maximum overall thickness of the keyboard 102. Thus, space within the electronic device 100 can be more efficiently filled in the configuration of FIG. 3 because there is less air or unfilled voids (e.g., 201) within the keyboard 102.

FIG. 2 shows that the magnets 206 on the movable layer 204 are horizontally offset and vertically misaligned relative to the key mechanisms 103, 200. In FIG. 3, the magnets 206 are vertically aligned with the key mechanisms 103, 200. In this embodiment, the magnets 206 can magnetically attract the key mechanisms 103, 200 toward the movable layer 204. As used herein, two parts are "vertically aligned" if a vertical axis extending through one of the parts also extends through the other part. Similarly, two parts are "horizontally aligned" if a horizontal axis extends through both parts. A vertical direction as used herein extends perpendicularly through a top surface of the keycaps shown in the figures, and horizontal direction extends perpendicular to the vertical direction.

In the configuration of FIG. 2, the magnets 206 do not apply a sufficient magnetic force to withdraw and retract the key mechanisms to the base layer 202 due to being spaced sufficiently far enough away from ferrous material in the key mechanisms to avoid keeping the key mechanisms in the retracted configuration. By comparison, the relatively closer position of the magnets 206 relative to ferrous parts of the key mechanisms in FIG. 3 causes the keycaps 103 to remain retracted without a mechanical downward force being applied on the top surface of the keycaps 103 (e.g., a user or the display 106 pressing down on the keycaps 103). Thus, the keycaps 103 are retracted by the magnets 206 independent of a top-surface-applied force.

The movable layer 204 can be a linkage connected to the hinge 114 that is movable in response to rotation of the hinge 114. For example, the movable layer 204 can be configured to translate laterally under the keycaps 103 and stabilizers 200 as the upper housing 110 of the housing 104 rotates relative to the base housing 112. The movable layer 204 can comprise a flexible material configured to wrap and unwrap around the hinge 114 (as can be seen by comparing hinge 114 and movable layer 204 in FIGS. 2 and 3), a roller or other component that may be associated with the hinge. For example, the movable layer 204 can comprise a fabric, textile, flexible polymer sheet, flexible metal sheet, flexible composite sheet, other similar material, or combinations thereof. In one embodiment, the flexible material comprises a VECTRAN(R) sheet. In some embodiments, the movable layer 204 comprises a rigid material configured to slide in response to movement of the hinge 114. The movement of the movable layer 204 can move the magnets 206 between a first position that holds the keycaps 103 downward and a second position that allows the keycaps 103 to raise upward relative to the base layer 202. The movable layer 204 can comprise one or more sheets, rods, strips of material, related components, or combinations thereof.

The hinge 114 can comprise a single-axis pivoting hinge (e.g., similar to a door/barrel hinge), or it can comprise a multi-pivot hinge (e.g., a hinge with multiple parallel pivoting axes that extend through multiple relatively pivotable segments). The movable layer 204 can be directly or indirectly connected to an outer radial portion of the hinge 114 as a linkage that translates as the hinge 114 rotates, as diagrammatically shown in the broken lines of FIGS. 2-3. In some embodiments, multiple axially-aligned hinges are connected to the movable layer 204, such as, for example, one hinge at each end of the position of the hinge 114 of FIG. 1.

The magnets 206 can comprise a set of permanent magnets, electromagnets, or combinations thereof. In some embodiments, the movement of the movable layer 204 moves the magnets 206 and thereby increases or decreases the magnetic attraction or repulsion forces applied to the keycaps 103, stabilizers 200, or both. As disclosed elsewhere herein, the magnets 206 can also be part of a system for providing tactile force feedback for the keyboard 102.

Figure 4:
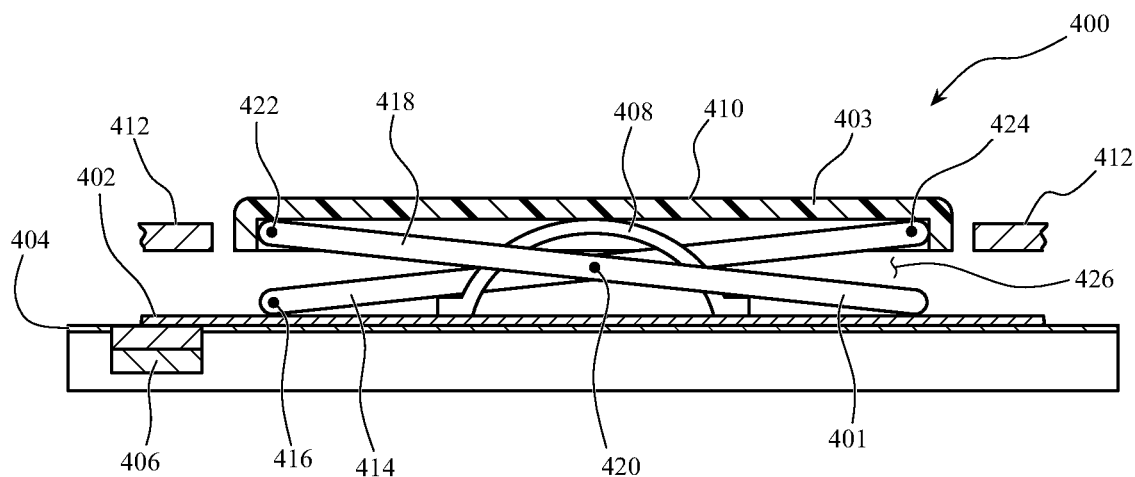
FIG. 4 shows a diagrammatic side section view of a key assembly in a raised condition.

FIG. 4 is a detail side view of a key assembly 400 according to an example embodiment of the present disclosure. The assembly 400 can comprise a keycap 403 (similar to keycaps 103), a stabilizer 401 (similar to stabilizers 200), a base layer 402 (similar to base layer 202), a movable layer 404 (similar to movable layer 204), and a magnetic structure 406 (similar to magnets 206). A collapsible dome 408 is shown positioned between the keycap 403 and the base layer 402. The dome 408 can be mounted to the base layer 402 centered under the keycap 403. The dome 408 can be elastically collapsible and compressible to provide tactile force feedback and an upward biasing force to the key assembly 400. The dome 408 can be retractable, meaning it can be compressed into a reduced thickness or it can be moved relative to the base layer 402 when the keycap 403 moves relative to the base layer 402. In one embodiment, retraction of the keycap 403 can cause the dome 408 to move through the base layer 402 or through the movable layer 404 without the dome 408 being compressed. Thus, the dome 408 can be moved to a retracted position without being subject to compressive stresses.

In FIG. 4, the keycap 403 is in a raised condition wherein the keycap 403 is spaced away from the base layer 402 and the stabilizer 401 and dome 408 are expanded. A void 426 is positioned between the keycap 403 and the base layer 402. In this condition, a downward force applied to the top surface 410 of the keycap 403 can compress the dome 408 and collapse the stabilizer 401. Releasing the downward force can allow the keycap 403, stabilizer 401, and dome 408 to return to the position shown in FIG. 4. Thus, the keycap 403 can be referred to as being in an actuatable raised condition or an extended condition in FIG. 4. In this condition, the top surface 410 of the keycap 403 is positioned higher than the surrounding web structure 412 (which is comparable to top surface 208).

In the state shown in FIG. 4, the magnetic structure 406 is out of vertical alignment with the keycap 403, stabilizer 401, and dome 408. The stabilizer 401, keycap 403, or a portion of either can comprise a ferrous material (or another member having a ferrous material attached thereto), but due to the location of the magnetic structure 406 relative of the ferrous material, the stabilizer 401 and keycap 403 are able to move without being secured in place by the magnetic attraction between the magnetic structure 406 and the ferrous material. See also FIG. 12 and its related descriptions herein which also can apply to the embodiment shown in FIG. 4. For example, the stabilizer 401 can comprise a ferrous wing or arm 414 that is pivotably connected to the base layer 402 at pivot point 416. The magnetic structure 406 is positioned at a laterally offset position relative to the wing or arm 414 (e.g., at a location that is laterally between adjacent keys 403) and therefore does not draw down the arm 414.

Figure 5:
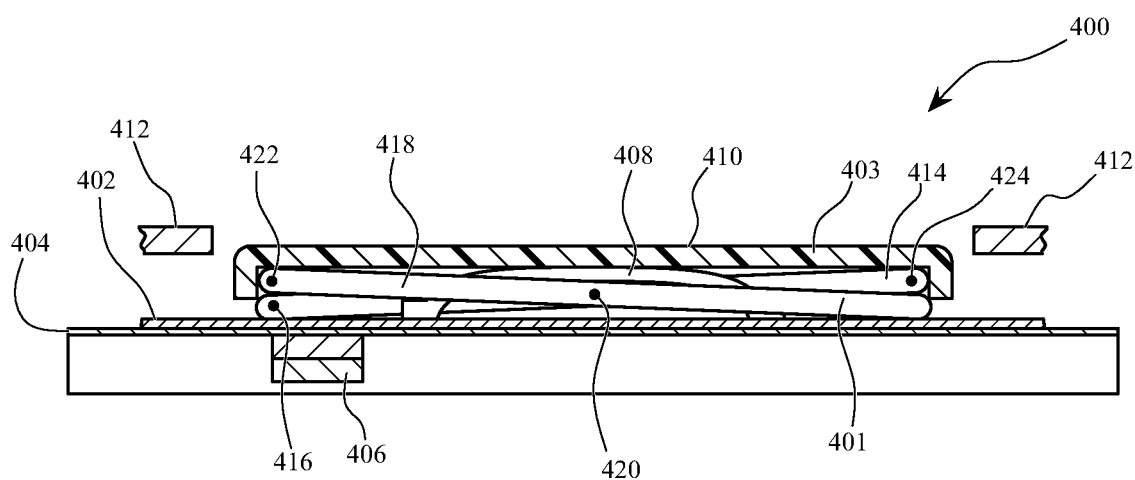
FIG. 5 shows the key assembly of FIG. 4 in a retracted position.

FIG. 5 is a detail side view of the key assembly 400 with the magnetic structure 406 repositioned under the arm 414 of the stabilizer 401 (i.e., to a position below and vertically aligned with the arm 414 and keycap 403). In comparing FIGS. 4 and 5, it is noted that the position of the magnetic structure 406 in FIG. 5 is laterally closer to the vertical axis of movement of the keycap 403 than the position of the magnetic structure 406 in FIG. 4. In this position (i.e., as shown in FIG. 5), the magnetic attraction force applied to the stabilizer arm 414 draws the arm 414 toward the magnetic structure 406 and therefore rotates the arm 414 about the pivot point 416. The scissor mechanism configuration of the stabilizer 401 also draws down the other arm 418 (see FIG. 4) of the stabilizer 401 due to the other arm 418 being pivotably connected to the ferrous arm 414 at a central pivot axis 420. Accordingly, the stabilizer 401 is in a collapsed configuration in FIG. 5. The keycap 403 can be attached to the stabilizer 401 at rotatable connection points 422, 424, so the keycap 403 can be drawn downward by the arms 414, 418 of the stabilizer 401. Movement of the keycap 403 can also cause compression of the dome 408. Accordingly, positioning the magnetic structure 406 underneath and vertically aligned with the ferrous arm 414 can collapse the keycap 403 and stabilizer 401 into the void 426 (see FIG. 4) that is defined between the keycap 403 and base layer 402 when the keycap is in the raised condition without external force being applied to the top of the key cap 403.

In order for the magnetic structure 406 to move between the first position of FIG. 4 and the second position of FIG. 5, the magnetic structure 406 translates laterally under the base layer 402. Between the position of FIG. 4 and the position of FIG. 5, the magnetic structure 406 moves from left to right. It will be understood that in some embodiments, the magnetic structure 406 can move from right to left (e.g., as indicated in FIGS. 2 and 3), can move in a direction perpendicular to the page in FIGS. 4 and 5, or can move in another lateral direction. The translation can be provided by lateral movement of the movable layer 404. The movable layer 404 can translate in response to operation of a mechanism in the electronic device 100 (e.g., separating or rotating the upper housing 110 of the housing 104 away from the base housing 112). In some embodiments, the movable layer 404 can translate in response to a user operating a positioning mechanism such as by sliding a handle or lever (not shown) on or in the housing 104.

Figure 6:
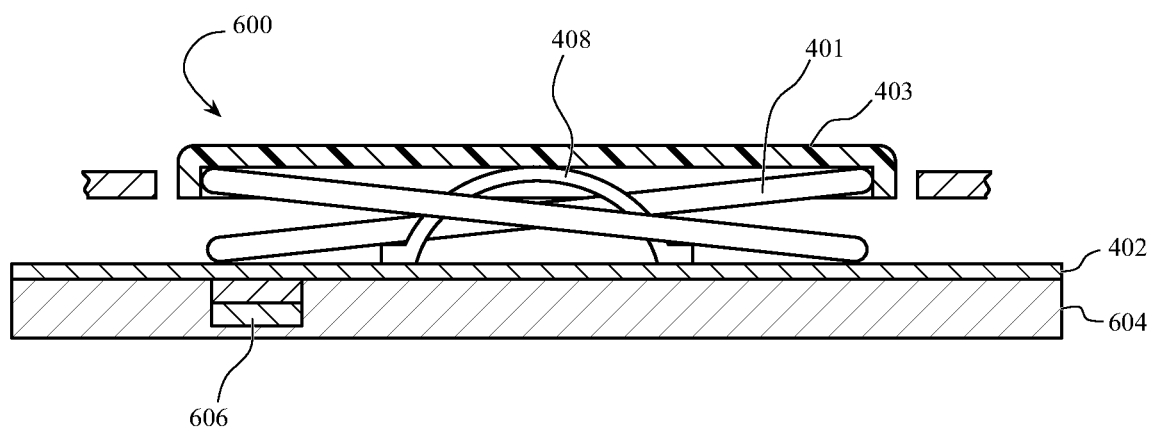
FIG. 6 shows a diagrammatic side section view of an alternative embodiment of a key assembly in a raised condition.

In the embodiment of FIG. 6, a static layer 604 is provided in place of a movable layer (e.g., 404). The static layer 604 can be held stationary or fixed relative to the base layer 402. The static layer 604 can have a set of electromagnets 606 configured to be activated (i.e., to generate a magnetic field and an attractive force on the stabilizer 401) or to be deactivated (i.e., to not generate the magnetic field and not apply the attractive force). The electromagnets 606 can be connected to an electric circuit (not shown) configured control their activation, deactivation, or strength.

The static layer 604 and magnet 606 can remain in the position shown in FIG. 6 and can allow the key to operate without being significantly magnetically attracted or repelled by the magnet 606 while the electromagnet is deactivated. Furthermore, when the electromagnet is activated, the keycap 403 can be retracted downward toward the base layer 402, thereby reducing the thickness of the key assembly 600. In some embodiments, the electromagnet can change polarity in order to selectively attract or repel the magnetic structures of the keycap 403 or stabilizer 401.

Figure 7:
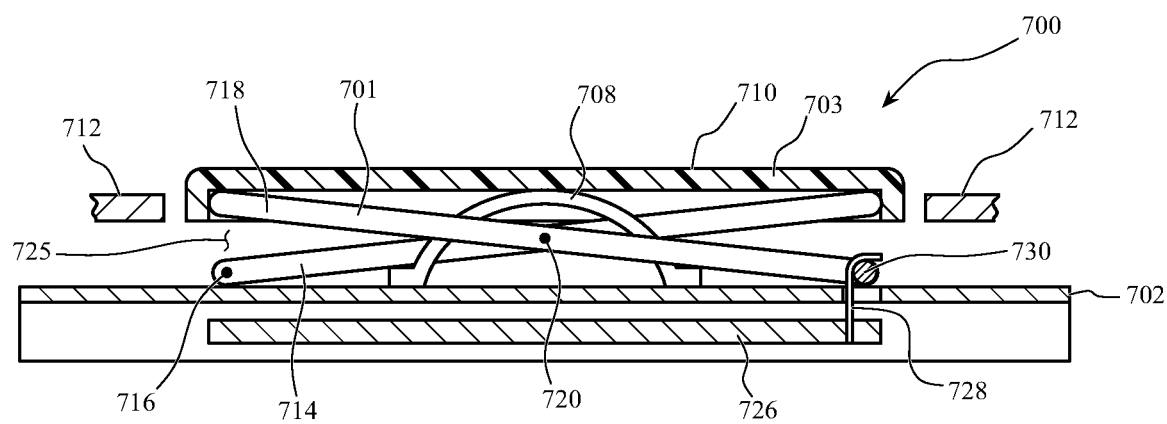
FIG. 7 shows a diagrammatic side section view of another embodiment of a key assembly in a raised condition.

FIG. 7 shows another embodiment of a key assembly 700 according to the present disclosure. In this embodiment, similar indicator numerals are used to signify similar parts. The keycap 703 can be linked to the base layer 702 by a stabilizer 701 that has a scissor mechanism configuration. In this case, a magnet may be omitted. Instead, retraction of the stabilizer 701 and keycap 703 can be caused by a mechanical force applied when the movable layer 726 moves relative to the base layer 702. Lateral translation of the movable layer 726 can effect lateral displacement of a hook 728 (or other engaging element such as, for example, a clip or fastener) that is coupled with a pin 730 (or other second engaging element corresponding to the first engaging element (e.g., hook 728)). As used herein, a part can be "coupled" to another part if it is in direct contact with the other part or directly attached to the other part.

The pin 730 can be positioned on an arm 718 of the stabilizer 701. Therefore, lateral movement of the pin 730 can induce vertical movement of the keycap 703 due to the pivot axis 720 attaching a second arm 714 with the first arm 718. The second arm 714 can be pivotably connected to the base layer 702 (e.g., at pivot axis 716) and therefore would not translate with the pin 730 of the first arm 718.

Figure 8:
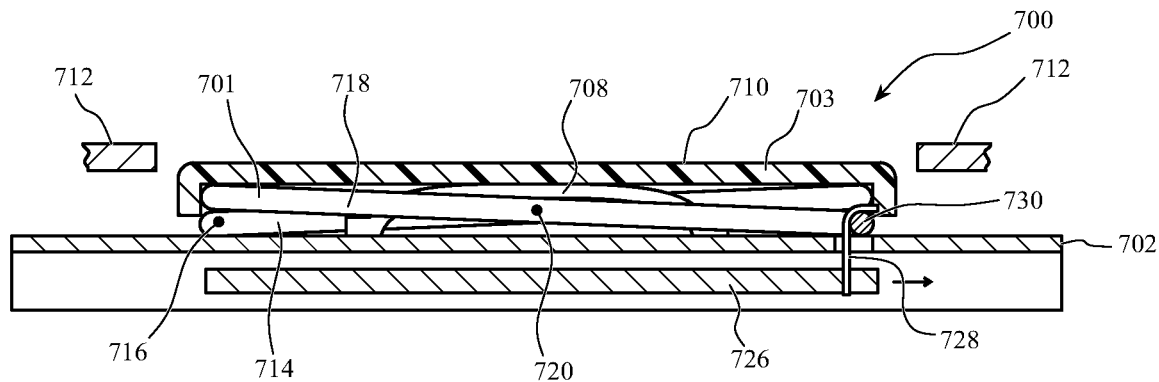
FIG. 8 shows the key assembly of FIG. 7 in a retracted position.

As shown in FIG. 8, lateral translation of the pin 730 can induce retraction of the keycap 703 by collapsing the stabilizer 701 into the void 725 (defined between the keycap 703 and the base layer 702 when in the position shown in FIG. 7). Accordingly, the keycap 703 can be retracted without necessarily applying a magnetic force. The movable layer 704 can be mechanically linked to the hinge 114, a handle, or other mechanism to translate the movable layer 704 and collapse the keys by applying a mechanical force to the stabilizers 701. In some embodiments, this type of mechanical retractor can be used in combination with magnetic retraction devices described elsewhere herein.

Figure 9:
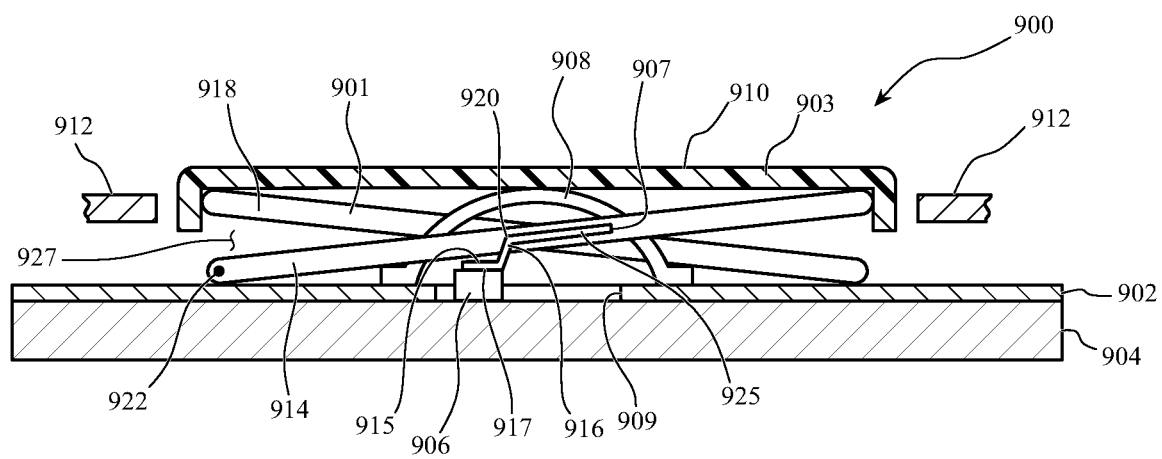
FIG. 9 shows a diagrammatic side section view of another embodiment of a key assembly in a raised condition.
Figure 10:
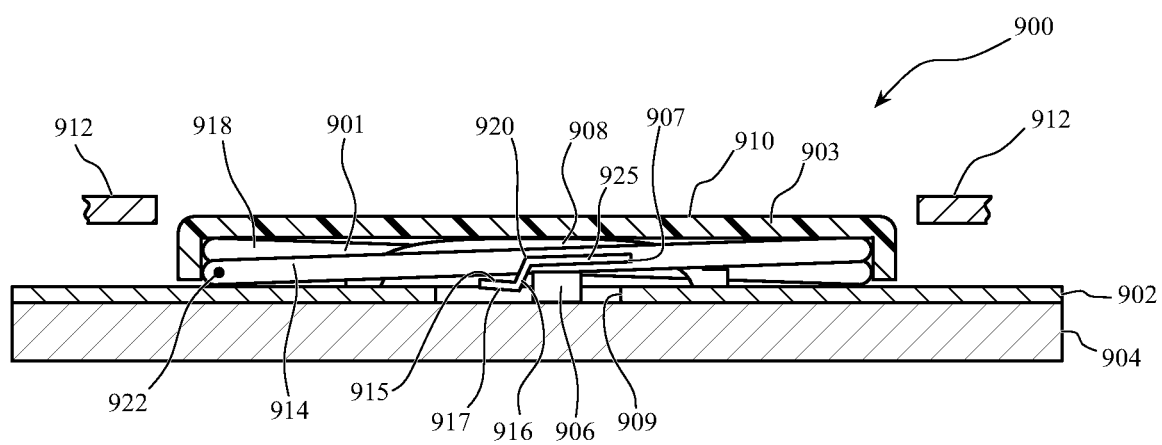
FIG. 10 shows the key assembly of FIG. 9 in a retracted position.
Figure 11:
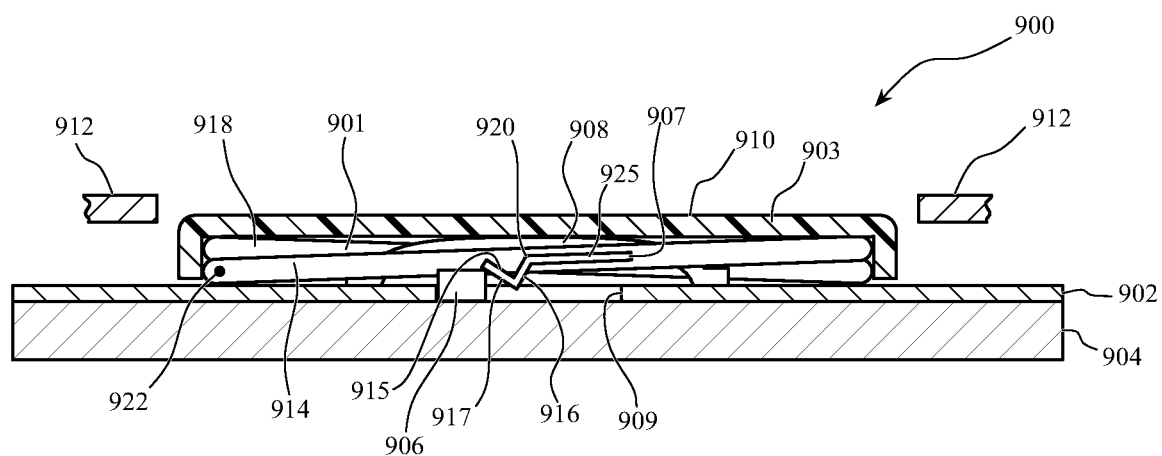
FIG. 11 shows the key assembly of FIG. 9 in a depressed position.

Another embodiment of the present disclosure is shown in the diagrammatic side section views of FIGS. 9-11. As shown in FIG. 9, a key assembly 900 can include a keycap 903 supported by a stabilizer 901 and a dome 908 on a base layer 902. The stabilizer 901 can have arms 914, 918 that are pivotable relative to each other about a pivot axis 920 when the keycap 903 is depressed. The arms 914, 918 can be mounted to the base layer 902 and to the keycap 903 and can slide or pivot while coupled with the base layer 902 or keycap 903.

A movable layer 904 can be positioned below the base layer 902 and can be laterally translatable, similar to other movable layers described herein. A first magnetic structure 906 can be coupled to the movable layer 904, and a second magnetic structure 907 can be coupled to the stabilizer 901. The first magnetic structure 906 and second magnetic structure 907 can be a pairing of a magnet and a ferrous structure attracted to the magnet or a pairing of two magnets configured to be attracted to each other. In the embodiment shown in FIG. 9, the first magnetic structure 906 is a magnet coupled with the movable layer 904, and the second magnetic structure 907 is a ferrous material coupled with or integrally formed with the stabilizer 901.

The first magnetic structure 906 can be configured to move with the movable layer 904. Thus, lateral translation of the movable layer 904 can correspond to lateral translation of the first magnetic structure 906. The first magnetic structure 906 can be configured to slide within an opening 909 through the base layer 902.

The second magnetic structure 907 can be coupled to the stabilizer 901. As shown in FIG. 9, the second magnetic structure 907 can be mounted to or can be a part of an arm 914. The second magnetic structure 907 can extend across the pivot axis 920 of the stabilizer 901, wherein a tactile portion 915 (or first portion) of the second magnetic structure 907 is positioned on a first side of the pivot axis 920 and a retraction portion 925 (or second portion) of the second magnetic structure 907 is positioned on a second, opposite side of the pivot axis 920. As shown in FIG. 9, the tactile portion 915 can be positioned on a left side of the pivot axis 920, and the retraction portion 925 can be positioned on a right side of the axis 920. In some embodiments, the retraction portion 925 can be parallel to the major axis of the arm 914 on which it is located, and the tactile portion 915 can be at least partially non-parallel to the major axis.

The tactile portion 915 can comprise an extension segment 916 and a coupling segment 917 of the second magnetic structure 907. The coupling segment 917 can be configured to contact a surface of the first magnetic structure 906 when the first magnetic structure is positioned on the same side of the pivot axis 920 as the coupling segment 917 and the keycap 903 is in a raised condition, as shown in FIG. 9.

When the movable layer 904 translates under the base layer 902, the first magnetic structure 906 slides within the opening 909, as shown in FIG. 10. The attraction between the second magnetic structure 907 and the first magnetic structure 906 draws the retraction portion 925 of the second magnetic structure 907 downward, thereby collapsing the stabilizer 901 and retracting the keycap 903. Accordingly, vertically aligning the retraction portion 925 and the first magnetic structure 906 can reduce the thickness of the key assembly 900 and can position the keycap 903 and stabilizer 901 to take up empty space within the void 927 (see FIG. 9) between the keycap 903 and the base layer 902.

The retraction portion 925 of the second magnetic structure 907 can be sized to enhance the attractive force that draws it to the first magnetic structure 906. For example, the length or thickness of the retraction portion 925 can be greater than the length and thickness of the tactile portion 915. In some embodiments, the material used in the retraction portion 925 is more magnetically attracted to the first magnetic structure 906 than the material used in the tactile portion 915.

Additionally, the first magnetic structure 906 can move from one side of the pivot axis 920 (as shown in FIG. 9) to the opposite side thereof (as shown in FIG. 10). Therefore, if the arm 914 is pivotally connected to the base layer 902 (e.g., about pivot axis 922), the first magnetic structure 906 can apply a greater moment to the arm 914 as it moves away from the pivot axis 922, thereby more easily collapsing the stabilizer 901. Furthermore, the extension segment 916 can extend at an angle downward away from the major axis of the arm 914 and thereby can allow the arm 914 (and second magnetic structure 907) to rest on the first magnetic structure 906 relatively higher up when the keycap 903 is in the raised condition (FIG. 9) as compared to when the arm 914 rests on the first magnetic structure 906 and the keycap 903 is in the retracted condition (FIG. 10). In other words, the spacing of the coupling segment 917 due to the size and orientation of the extension segment 916 can allow the coupling segment 917 to contact the first magnetic structure 906 with the keycap 903 farther from the base layer 902 than when the retraction portion 925 contacts the first magnetic structure.

The key assembly 900 can have its keycap 903 retracted in response to lateral movement of the movable layer 904. Said another way, the key assembly 900 can retract its keycap 903 and stabilizer 901 in response to a change in a magnetic field applied to the stabilizer 901 or keycap 903. The change in the magnetic field can be a change in the relative position of the magnetic field relative to a magnetic structure of the keycap or stabilizer.

The first magnetic structure 906 can be translated from the position shown in FIG. 10 to the position shown in FIG. 9. As it moves, the magnetic structure 906 can slide against the extension segment 916. The angled orientation of the extension segment 916 can direct the lateral force applied by the translation of the first magnetic structure 906 into an at least partially upward-directed force on the stabilizer 901, thereby assisting the return of the stabilizer 901 to its raised condition shown in FIG. 9. Thus, the first magnetic structure 906 can break contact with the retraction portion 925 as it translates from the retraction configuration (of FIG. 10) to the extended configuration (of FIG. 9).

In the embodiment of FIGS. 9-11, a collapsible dome 908 can be included to provide tactile force feedback when the keycap 903 is pressed. In some embodiments, the collapsible dome 908 can be omitted from the assembly 900. For example, in some cases the device maker or user can desire to store the keyboard in a retracted condition for an extended period of time. In that time, some types of domes 908 can lose their resilience and elasticity due to heat, extended-duration and concentrated stresses (e.g., break-in effects), and related phenomena. Accordingly, domes 908 can be omitted in some cases to avoid subjecting domes 908 to these conditions.

Tactile force feedback in the assembly 900 can be provided by the dome 908, the interaction between the first magnetic structure 906 and the second magnetic structure 907, or both. For example, the magnetic structures can provide tactility by pivoting the second magnetic structure 907 while the first magnetic structure 906 is in a first position relative to the base layer 902 (e.g., the position of the first magnetic structure 906 in FIGS. 9 and 11), thereby breaking the contact between the coupling segment 917 and the surface of the first magnetic structure 906. Breaking that contact can require a preliminary amount of force applied to the keycap 903 in order to overcome the magnetic attractive force pulling them together. Once the attractive force is overcome, the keycap 903 can move more easily until it reaches a bottomed-out condition. Accordingly, the force-displacement curve of the switch can include an initially increasing amount of force that peaks (i.e., at a peak tactile force) substantially before the magnetic attractive force begins to be overcome and the first magnetic structure 906 at least partially starts to break contact with the coupling segment 917 in the manner shown in FIG. 11. The unit force per unit of displacement then decreases until a bottom-out condition is reached (i.e., the condition shown in FIG. 11). During this motion, the stabilizer 901 can collapse with the arms 914, 918 pivoting about pivot axis 920 and thereby pulling the coupling segment 917 at least partially away from the first magnetic structure 906. In some arrangements, the decoupling of the coupling segment 917 and the first magnetic structure 906 can be configured to enhance and supplement the peak tactile force of a dome 908 that provides its own peak tactile force or resistance to compression that is overcome as the dome 908 collapses or buckles.

Referring now more generally to the figures, a magnetic structure can have various configurations on a stabilizer (e.g., 200, 401, 901). For example, stabilizer 401 can comprise an arm 418, wherein the entire length of the arm 418 comprises a magnetic material. For example, the arm 418 can be constructed of a ferrous material or can comprise a ferrous material that is distributed throughout the length of the arm 418. A rod or other piece of material that has a substantially similar length to the entire arm 418 can be positioned in or attached to the arm 418. Thus, the magnetic structure 406 can draw the arm 418 toward it when the magnetic structure 406 is located vertically under the arm 418. When the arm 418 is being retracted, the magnetic structure 406 can be configured to move under the highest portion of the arm 418 (i.e., the part of the arm 418 that is spaced furthest away from the base layer 402) since the magnetic force applied to the arm 418 at that end can be configured to apply a greater moment to the arm 418 than application of the magnetic force at the opposite end thereof (i.e., under rotatable connection 424 in FIG. 4). Thus, the strength of the magnetic structure 406 can be optimized to apply enough force to retract the arm 418 without being unnecessarily strong and potentially interfering with the operation of other parts of the keyboard (e.g., 102) or electronic device (e.g., 100). These principles and features can be implemented in any of the stabilizers described herein.

In some embodiments, the base layer 402 can comprise segments or portions configured to divert magnetic flux emitted by the magnetic structure 406. Accordingly, the base layer 402 can significantly divert magnetic flux away from magnetic material in the stabilizer 401 or keycap 403 when the magnetic structure 406 is in the position shown in FIG. 4, and the base layer can less significantly divert magnetic flux of the magnetic structure 406 that acts on the stabilizer 401 or keycap 403 when the magnetic structure 406 is in the position shown in FIG. 5. Similar flux-absorbing or flux-diverting portions or sections can be provided in other base layers described herein as well.

Figure 12:
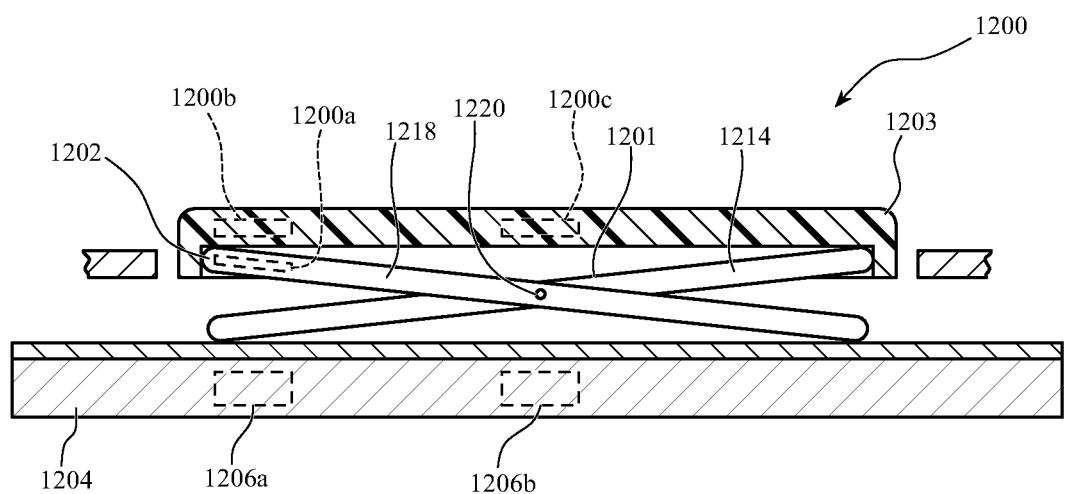
FIG. 12 shows a diagrammatic side section view of other embodiments of a key assembly in a raised condition.

In some arrangements, the shape and positioning of a magnetic structure on an arm can be optimized based on the expected location of the magnetic structure in the movable layer. For example, as shown in FIG. 12, a magnetic element 1200a can have a shape and position wherein it is confined to an upper end 1202 of an arm 1218. Thus, the magnetic element 1200a can be substantially entirely positioned vertically above the magnetic element 1206a of the movable layer 1204 when the magnetic element 1206a is in a retraction position relative to the arm 1218. The movement of the magnetic element 1206 can be along a direction that is extends at an angle (e.g., perpendicular) to the pivot axis 1220 or parallel to the pivot axis 1220.

In some embodiments, both arms 1214, 1218 can comprise the magnetic element of the stabilizer 1201. Thus, part or all of the lengths of both arms 1214, 1218 can comprise magnetic material attracted to a magnetic element 1206a. With the magnetic element 1206a positioned relatively close to the arm 1214 as compared to arm 1218, a lesser moment can be applied by the magnetic element 1206a to the lower arm 1214 as compared to the upper arm 1218. With the magnetic element 1206b positioned more centrally under the stabilizer 1201, a substantially equal attractive force can be applied by the magnetic element 1206b to each arm 1214, 1218. The magnetic element 1206 can move from a position not vertically aligned with the stabilizer 1201 to a position vertically aligned with the stabilizer 1201. Thus, in some cases, the magnetic element 1206b can be positioned under the keycap 1203 and stabilizer 1201, and if a collapsible dome is also included, the magnetic element 1206b can be positioned under the dome as well. In some embodiments, the collapsible dome can comprise a magnetic structure or material that, when positioned within a magnetic field of sufficient strength coming from the magnetic element 1206b, can be attracted to or repelled by the magnetic element 1206b.

Similarly, a magnetic element 1200b can be positioned on an end of the keycap 1203, can be centrally positioned in the keycap 1203 (e.g., magnetic element 1200c), can be positioned around a perimeter of the keycap 1203, or can be generally distributed throughout the keycap 1203. In each case, the magnetic element (1206a, 1206b, or other magnetic element in movable layer 1204) can apply a different amount of magnetic attractive force to the keycap 1203 to pull on the keycap 1203 as needed to overcome any upward bias on the keycap 1203 (e.g., by a dome, spring, or other biasing member) based on the strength of the magnetic field and the distance and orientation of the magnetic elements 1200, 1206.

Figure 13:
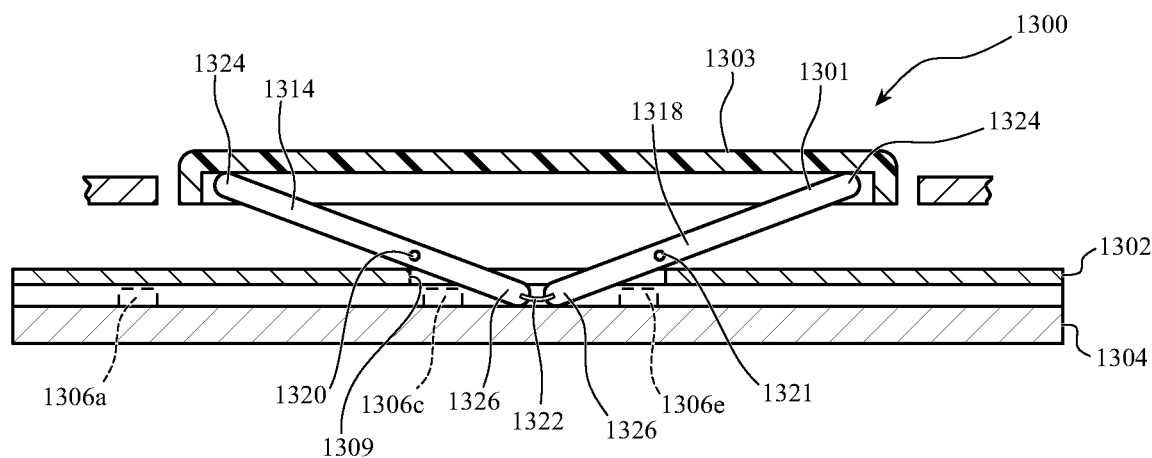
FIG. 13 shows a diagrammatic side section view of another embodiment of a key assembly in a raised condition.
Figure 14:
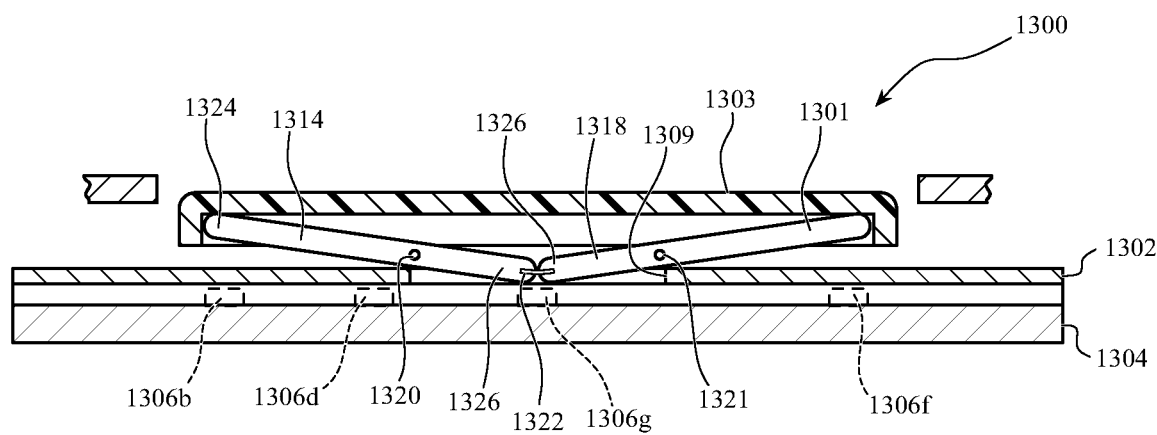
FIG. 14 shows the key assembly of FIG. 13 in a retracted position.

FIGS. 13-14 show aspects of an additional embodiment of the present disclosure. The key assembly 1300 of these figures can include a keycap 1303 supported by a wing-hinged butterfly mechanism 1301 and base layer 1302. The butterfly mechanism 1301 can stabilize the vertical movement of the keycap 1303 to limit tilting or rotation of the keycap 1303 as it is pressed downward. The butterfly mechanism 1301 can therefore be referred to as a stabilizer. The butterfly mechanism 1301 can comprise arms 1314, 1318 and two pivot axes 1320, 1321. The arms 1314, 1318 can be joined by a hinge 1322. The hinge 1322 can comprise a bendable connective material (as shown in FIGS. 13-14) or a set of interlocking teeth or gears (not shown) that convert rotational movement of one arm (e.g., movement of 1314 about 1320) into corresponding opposite rotational movement the other arm (e.g., movement of 1318 about 1321).

The butterfly mechanism 1301 can comprise a magnetic structure. For example, one or both of the arms 1314, 1318 can be a magnetic structure or can comprise a magnetic structure. The magnetic structure can be positioned in an outer end (e.g., 1324) or an inner end (e.g., 1326) of an arm 1314, 1318. In other words, the magnetic structure can be positioned on an outer side of a pivot axis (e.g., end 1324 is on an outer side of pivot axis 1320) or an inner side thereof (e.g., end 1326 is on an inner side of pivot axis 1320. Alternatively, the inner and outer ends of the arm can have a magnetic structure or the entire arm can be a magnetic structure. The magnetic structure of the arm can be referred to as a first magnetic structure and can comprise one or more ferrous materials or magnets. In some embodiments, the keycap 1303 can comprise the first magnetic structure in the manner described in connection with keycap 1203 herein.

The pivot axes 1320, 1321 can be pivotally connected to the base layer 1302. The pivot axes 1320, 1321 can be referred to as fulcrums of the arms 1314, 1318, and forces applied to the arms 1314, 1318 can be comparable to forces applied to lever arms.

A second magnetic structure 1306 can be positioned on a movable layer 1304 below the base layer 1302 and below the first magnetic structure. As with other movable layers described herein, the movable layer 1304 can move laterally to adjust the position of the second magnetic structure 1306.

In a first embodiment, a second magnetic structure 1306a is positioned out of vertical alignment with the first magnetic structure in the keycap 1303 or the outer end 1324 of the arm 1314, as shown in FIG. 13. In this state, the keycap 1303 and butterfly mechanism 1301 can be operated without significant inhibition by the second magnetic structure 1306a.

The key assembly 1300 can be transitioned to a retracted state by repositioning the movable layer 1304 and second magnetic structure 1306b as shown in FIG. 14. In that position, the second magnetic structure 1306b is vertically aligned with at least a portion of the first magnetic structure in the keycap 1303 or arm 1314, and it draws the first magnetic structure downward in response. In other words, the butterfly mechanism 1301 collapses or has its arm 1314 pivot when acted upon by the force of magnetic attraction between the first and second magnetic structures. The pivoting of the arm 1314 about the pivot axis 1320 induces pivoting of arm 1318 about pivot axis 1321 due to their connection at hinge 1322. Accordingly, the entire assembly 1300 is reduced in thickness.

In a second embodiment, a second magnetic structure 1306c can be positioned inward of a pivot axis (e.g., 1320 in FIG. 13). In other words, the second magnetic structure 1306c can be positioned under an inner end (e.g., 1326) of an arm (e.g., 1314). In some embodiments, as shown in FIG. 13, the second magnetic structure 1306c can be positioned vertically aligned with an opening 1309 through the base layer 1302. The opening 1309 can accommodate the inner ends 1326 of the stabilizer 1301. The area near and under opening 1309 can also be an area in which a magnetic field from the second magnetic structure 1306c is less absorbed or redirected in comparison to the base layer 1302.

The first magnetic structure can be at least partially in the inner end 1326 of the arm 1314 (or in the inner end of arm 1318). In this state, the magnetic attraction between the magnetic structures can draw the inner end or ends of the butterfly mechanism 1301 downward, so the keycap 1303 is biased upward as the arms 1314, 1318 pivot about their pivot axes 1320, 1321. In some embodiments, the arm 1314 contacts the second magnetic structure 1306c. Pressing the keycap 1303 downward in this case can require force sufficient to overcome the magnetic attraction between the magnetic structures. Therefore, the magnetic structures can provide or supplement peak tactile force feedback when the keycap 1303 is pressed. In some arrangements, a compressible dome (e.g., similar to dome 908) can also be included to supply force feedback, as described elsewhere herein. In some embodiments, there is no first magnetic element in the inner end 1326, and the second magnetic element 1306c does not attract the inner end 1326 or keycap in the position shown in FIG. 13.

The key assembly 1300 can be transitioned to a retracted state by repositioning the movable layer 1304 and second magnetic structure 1306d, as shown in FIG. 14. In that position, the second magnetic structure 1306d is vertically aligned with at least a portion of the first magnetic structure in the keycap 1303 or arm 1314 that is outwardly positioned relative to the pivot axis 1302. Accordingly, the keycap 1303 is drawn downward, the butterfly mechanism 1301 collapses, and the entire assembly 1300 is reduced in thickness. The movement of the second magnetic structure from the position of 1306c to the position of 1306d is a movement from a first side (i.e., right side of 1320 in FIG. 13) of a pivot axis 1302 of the arm 1314 to a second, opposite side thereof (i.e., left side of 1320 in FIG. 14).

In some cases, such as when the second magnetic structure 1306c attracts the inner end 1326 in the position of FIG. 13, the second magnetic structure 1306d does not significantly magnetically attract the keycap 1303 or arm 1314 when in the position shown in FIG. 14. Another biasing force (e.g., gravity or a tension spring (not shown)) can draw the keycap 1303 or butterfly mechanism 1301 into the retracted position. In another case, the second magnetic structure 1306c can move from a position under an inner end 1326 of an arm 1314 to a position under a pivot axis (e.g., a position similar to second magnetic structure 1306e under axis 1321). When under a pivot axis, the second magnetic structure can apply a magnetic attractive force to the arm on both sides of the pivot axis, wherein the forces applied to each side substantially cancel out each other. In other words, the attractive magnetic force applied to the arm on each side of the pivot axis can generate moments on the arm that are substantially equal and opposite so that the arm is not drawn into the position shown in FIG. 14 by the second magnetic structure.

In a third embodiment, a second magnetic structure 1306e can be positioned under a pivot axis (e.g., axis 1321) and therefore does not apply a significant attractive magnetic force to the arm 1318. The keycap 1303 and butterfly mechanism 1301 can therefore move relatively uninhibited by the second magnetic structure 1306e between the raised position (shown in FIG. 13) and a depressed condition.

The key assembly 1300 can be transitioned to a retracted state by repositioning the movable layer 1304 and second magnetic structure 1306f, as shown in FIG. 14. The position of the second magnetic structure 1306f corresponds to position 1306b, wherein the butterfly mechanism 1301 is drawn into the collapsed configuration by magnetic attraction between a first magnetic structure of the arm 1318 or keycap 1303 and the second magnetic structure 1306f. Accordingly, the keycap 1303 is drawn downward, the butterfly mechanism 1301 collapses, and the entire assembly 1300 is reduced in thickness.

In a fourth embodiment, a second magnetic structure 1306e can be a protrusion on the surface of the movable layer 1304 that may or may not be magnetic. Movement of the movable layer 1304 can reposition the second magnetic structure 1306g under the hinge 1322 of the stabilizer 1301. See FIG. 14. This movement can cause the stabilizer 1301 to move into the retracted condition by the second magnetic structure 1306g mechanically pushing upward on one or both of the inner ends 1326 and limit how far downward those ends 1326 can move. Removing the structure 1306g from being under the inner ends 1326 can allow them to move and can thereby allow the keycap 1303 to return to a raised condition.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER(R) ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A keyboard, comprising: a base layer; a keycap; a stabilizer having a pair of arms coupled to the keycap and coupled to the base layer, the pair of arms being pivotable relative to each other about a pivot axis between a raised configuration and a lowered configuration, wherein the keycap and the pivot axis are spaced farther away from the base layer when in the raised configuration relative to the lowered configuration; a first magnetic structure movable between a first position relative to the base layer and a second position relative to the base layer; a second magnetic structure coupled to the stabilizer and having a first portion and a second portion, the first portion comprising a contact segment contacting the first magnetic structure while the stabilizer is in the raised configuration, the first portion comprising an extension segment extending downward away from the pivot axis and connecting the contact segment with the second portion while the stabilizer is in the raised configuration; wherein the first magnetic structure draws the stabilizer from the raised configuration to the lowered configuration upon movement of the first magnetic structure from the first position to the second position, and wherein the first magnetic structure magnetically attracts the contact segment to provide tactile force feedback to the keycap while the first magnetic structure is in the first position.

2. The keyboard of claim 1, wherein the stabilizer comprises a pivotable mechanism having a pivot point.

3. The keyboard of claim 2, wherein the first position of the first magnetic structure is located on a first side of the pivot point and the second position of the first magnetic structure is located on a second side of the pivot point, the second side being opposite the pivot point relative to the first side.

4. The keyboard of claim 2, wherein in the second position the first magnetic structure draws a portion of the stabilizer toward the base layer, the portion of the stabilizer being positioned opposite the pivot point relative to the first magnetic structure when the stabilizer is in the raised configuration.

5. The keyboard of claim 1, wherein the second magnetic structure comprises a ferrous portion attracted to the first magnetic structure.

6. The keyboard of claim 1, wherein the keycap comprises a ferrous portion attracted to the first magnetic structure.

7. The keyboard of claim 1, wherein the first magnetic structure is coupled to a slidable linkage, the slidable linkage being translatable relative to the keycap and stabilizer to move the first magnetic structure between the first and second positions.

8. The keyboard of claim 1, wherein in the first position the first magnetic structure is positioned laterally farther from a central axis of movement of the keycap than in the second position.

9. The keyboard of claim 1, further comprising a ferrous material in the contact segment, wherein upon movement of the stabilizer from the raised configuration to the lowered configuration, the first magnetic structure breaks contact with the ferrous material.

10. The keyboard of claim 9, wherein movement of the first magnetic structure from the first position to the second position breaks contact between the first magnetic structure and a portion of the ferrous material.

11. A laptop computer, comprising: a lid housing; a display positioned in the lid housing; a base housing connected to the lid housing by a hinge, the lid housing being movable relative to the base housing between a closed position wherein the display faces the base housing and an open position; a keyboard assembly positioned in the base housing, the keyboard assembly including: a set of keys movable between a retracted position relative to the base housing and an extended position relative to the base housing, wherein movement of the lid housing from the closed position to the open position causes the set of keys to move from the retracted position to the extended position; a stabilizer supporting a key of the set of keys and including a pair of arms joined at a pivot axis, wherein the pivot axis moves downward as the key moves from the extended position to the retracted position; a first magnetic structure positioned under the key; and a second magnetic structure coupled to an arm of the pair of arms, the arm having a major axis, wherein the magnetic structure extends at an angle downward and away from the major axis to rest on the first magnetic structure when the set of keys is in the extended position.

12. The laptop computer of claim 11, further comprising a linkage positioned in the base housing and movable between a first position and a second position, wherein movement of the lid housing relative to the base housing causes movement of the linkage between the first and second positions, wherein movement of the linkage applies a force to the set of keys to move the keys between the retracted and extended positions.

13. The laptop computer of claim 12, wherein the force is a mechanical force.

14. The laptop computer of claim 11, wherein the second magnetic structure is operable to draw the key of the set of keys from the extended position to the retracted position.

15. The laptop computer of claim 14, wherein rotation of the hinge is configured to move the second magnetic structure within the base housing.

16. A laptop computer, comprising: an upper housing coupled to a display; a lower housing having a top surface; a base layer positioned in the lower housing; a keycap positioned above the base layer, the keycap having an outward-facing surface, the keycap being movable between a first position and a second position, wherein in the first position the outward-facing surface is positioned higher than the top surface and in the second position the outward-facing surface is at most positioned in-plane with the top surface; a positioning mechanism actuatable to move at least one magnetic body in the lower housing in response to a user input, wherein movement of the at least one magnetic body is configured to move the keycap between the first and second positions; a scissor mechanism stabilizer supporting the keycap, having arms pivotable about a central pivot axis and pivotally connected to the base layer separate from the central pivot axis, wherein at least one arm of the arms has a major axis; and a magnetic structure coupled to the at least one arm of the scissor mechanism stabilizer, the magnetic structure having a first portion parallel to the major axis and on a first side of the central pivot axis and a second portion at least partially extending at an angle downward and away from the major axis on a second side of the central pivot axis toward the at least one magnetic body, the second side being opposite the pivot axis relative to the first side; wherein a magnetic field output by the at least one magnetic body is configured to provide tactile force feedback to movement of the keycap by attraction of the second portion of the magnetic structure.

17. The laptop computer of claim 16, wherein the user input comprises application of a force to move the upper housing relative to the lower housing.

18. The laptop computer of claim 16, wherein the at least one magnetic body translates in the lower housing in response to the user input.

19. The laptop computer of claim 16, further comprising a compressible dome retractable relative to the lower housing in response to the user input.

* * * * *